United States Patent
Yan et al.

(10) Patent No.: US 12,382,273 B2
(45) Date of Patent: Aug. 5, 2025

(54) METHOD AND SYSTEM FOR DETECTION AND AUTOCORRECTION OF STALE SESSION INFORMATION

(71) Applicant: Verizon Patent and Licensing Inc., Basking Ridge, NJ (US)

(72) Inventors: Lixia Yan, Basking Ridge, NJ (US); Violeta Cakulev, Millburn, NJ (US); Ali Imdad Malik, East Brunswick, NJ (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 432 days.

(21) Appl. No.: 17/735,181

(22) Filed: May 3, 2022

(65) Prior Publication Data

US 2023/0362615 A1  Nov. 9, 2023

(51) Int. Cl.
*H04W 8/00* (2009.01)
*H04W 8/02* (2009.01)
*H04W 8/18* (2009.01)
*H04W 76/14* (2018.01)

(52) U.S. Cl.
CPC ............. *H04W 8/005* (2013.01); *H04W 8/02* (2013.01); *H04W 8/18* (2013.01); *H04W 76/14* (2018.02)

(58) Field of Classification Search
CPC ......... H04W 8/005; H04W 8/02; H04W 8/18; H04W 76/14; H04W 84/18
See application file for complete search history.

(56) References Cited

U.S. PATENT DOCUMENTS

| | | | |
|---|---|---|---|
| 2019/0253917 A1* | 8/2019 | Dao | H04W 76/27 |
| 2020/0145876 A1* | 5/2020 | Dao | H04L 12/1407 |
| 2022/0408251 A1* | 12/2022 | Castellanos Zamora | H04W 12/72 |
| 2023/0106091 A1* | 4/2023 | Shivashankara | G06F 9/541 |
| | | | 719/328 |
| 2023/0300200 A1* | 9/2023 | Krishan | H04W 76/18 |
| | | | 370/328 |

\* cited by examiner

*Primary Examiner* — Luat Phung (57) ABSTRACT

A method, a network device, and a non-transitory computer-readable storage medium are described in relation to an detection and autocorrection of stale session information service. The detection and autocorrection service may include the addition of a header, which may indicate date and time information, with a message that has an origination timestamp header. The header may be added to the message by an intermediary network device relative to origin and destination network devices associated with a network procedure. The header may enable detection by a network device of stale session information. The header may enable the network device to determine whether to ignore the message as a duplicate message or use the message to carry out the network procedure. In this way, duplicate messages that may include the same origination timestamp header may be managed and stale information may be detected.

20 Claims, 8 Drawing Sheets

METHOD AND SYSTEM FOR DETECTION AND AUTOCORRECTION OF STALE SESSION INFORMATION

BACKGROUND

Development and design of networks present certain challenges from a network-side perspective and an end device perspective. For example, Next Generation (NG) wireless networks, such as Fifth Generation New Radio (5G NR) networks are being deployed and under development.

DETAILED DESCRIPTION

The following detailed description refers to the accompanying drawings. The same reference numbers in different drawings may identify the same or similar elements. Also, the following detailed description does not limit the invention.

Due to network transport latency, queuing backup, and/or other unexpected raining conditions in a network, stale session information may be created in the network. For example, in a core network, such as a Fifth Generation (5G) core network, core network devices may store or be subject to stale session information. Stale session information may waste network resources, delay processing, cause session establishment failures, and/or other types of network-related delays, failures, counter-reactive procedures to be executed, and so forth. As an example, a binding support function (BSF) may store binding information that may enable other network functions (NFs) in the core network to obtain packet data unit (PDU) session binding information, such as which policy control function (PCF) is bound to a particular session.

Current network standards include the use of an Origination-Timestamp (O-T) Hypertext Transfer Protocol (HTTP) header to address stale session detection. The O-T HTTP header includes the date and time that the originating NF initiated an HTTP message. For example, an HTTP POST message may include a Create Session Management (SM) Context Request, an Update SM Context Request, a Release SM Context Request, and other types of messages that may also include the O-T HTTP header.

However, the O-T HTTP header mechanism does not adequately address all stale session use cases. For example, when an NF initiates an action, transmits a message relating to the action, and the action may involve multiple other NFs (which may also transmit/receive messages), the network procedure relating to that action can result in scenarios where message duplication detection is not eliminated despite the use of the O-T HTTP header. For example, an access and mobility management (AMF) may initiate an action relating to session management (SM) and establishment of a packet data unit (PDU) session associated with an end device (e.g., a user equipment (UE)). The AMF may generate and transmit an SM message, which includes the O-T HTTP header, to a session management function (SMF). In response to receiving the SM message, the SMF may communicate with other NFs that involves different messages. The SMF may include the O-T HTTP header, as set by the AMF, in such messages. For example, the SMF may transmit an SM Policy message to a first policy control function (PCF). The first PCF may respond to the SMF that a Create SM Context Request has been successfully bound with a binding support function (BSF), even though the first PCF has not received a response from the BSF or the first PCF has yet to transmit a request to the BSF (e.g., the first PCF has a message in a transmission queue). Typically, this type of asynchronous communication may minimize delay (e.g., by not waiting for the BSF response) in carrying out the network procedure.

The SMF may not receive the PCF response from the first PCF. The SMF may time out, and may retransmit the Create SM Context Request to a second PCF (i.e., a different PCF), in which binding information at the BSF is successfully created and stored. Thereafter, the BSF may receive the Create SM Context Request from the first PCF based on a queueing delay to transmit at the first PCF, for example. When the BSF receives a PCF Binding Request from the first PCF, the BSF cannot recognize that the PCF Binding Request is stale because it has the same O-T value as a PCF Binding Request received from the second PCF. According to this example, the SMF uses for both Create SM Context Requests to the first PCF and the second PCF, the same O-T value as set by the AMF. As a result, the BSF will overwrite the PCF binding information despite that the second PCF is associated with a session. As a consequence, when an NF queries the BSF for binding information, the binding information provided is stale and indicates the incorrect PCF. For example, when an application session is to be established, the stale binding information may be used which can result in an application session establishment failure based on a message being routed to the incorrect PCF.

According to exemplary embodiments, a detection and autocorrection of stale session information service is described. According to an exemplary embodiment, the detection and autocorrection of stale session information service includes adding one or multiple headers to a message that includes an O-T HTTP header. According to an exemplary embodiment, the added header includes date and time information set by an intermediary NF that may be part of a network procedure chain pertaining to an origin NF and the O-T HTTP header. For example, the SMF may add an HTTP header, which includes date and time information set by the SMF (in contrast to an AMF), to a message, in addition to the O-T HTTP header set by the AMF. According to an exemplary embodiment, the message may include multiple date and time information headers, such as one set by the AMF and one set by the SMF.

According to other exemplary embodiments, the number of added headers may be different and/or may involve a different NF(s). For example, depending on the number of NFs, the number of messages, and/or a characteristic (e.g., time-dependency, asynchronization, etc.) associated with a message and/or operation performed by the NF (e.g., intermediary NF, destination NF of the network procedure, etc.), two or more intermediary NFs and/or messages of a network procedure chain may include two or more date and time information HTTP headers in combination with the O-T HTTP header.

According to an exemplary embodiment, detection and autocorrection of stale session information service may manage session information based on the header, as described herein. According to an exemplary embodiment, a BSF may determine stale session binding information between different messages associated with a same session based on the origination date and time information of each of the messages. For example, according to the exemplary scenario described above, the BSF may not overwrite the PCF binding information associated with the second PCF and the second message from the SMF. Rather, the BSF may discard or ignore the first message from the first PCF and the SMF. For example, the BSF may determine that the first message is stale based on a comparison between the added HTTP header included in the first message and the date and time information of the added HTTP header in the second message (e.g., stored as part of the PSF binding information). In this way, the BSF may detect the stale session information despite that the first message includes the same O-T HTTP header information as the currently stored PCF binding information.

In view of the foregoing, the detection and autocorrection of stale session information service may prevent the creation and use of stale session binding information within a network. As a result, the detection and autocorrection of stale session information service may improve network resource utilization, minimize processing, delays, and session failures, and improve overall performance in the network.

Figure 1:
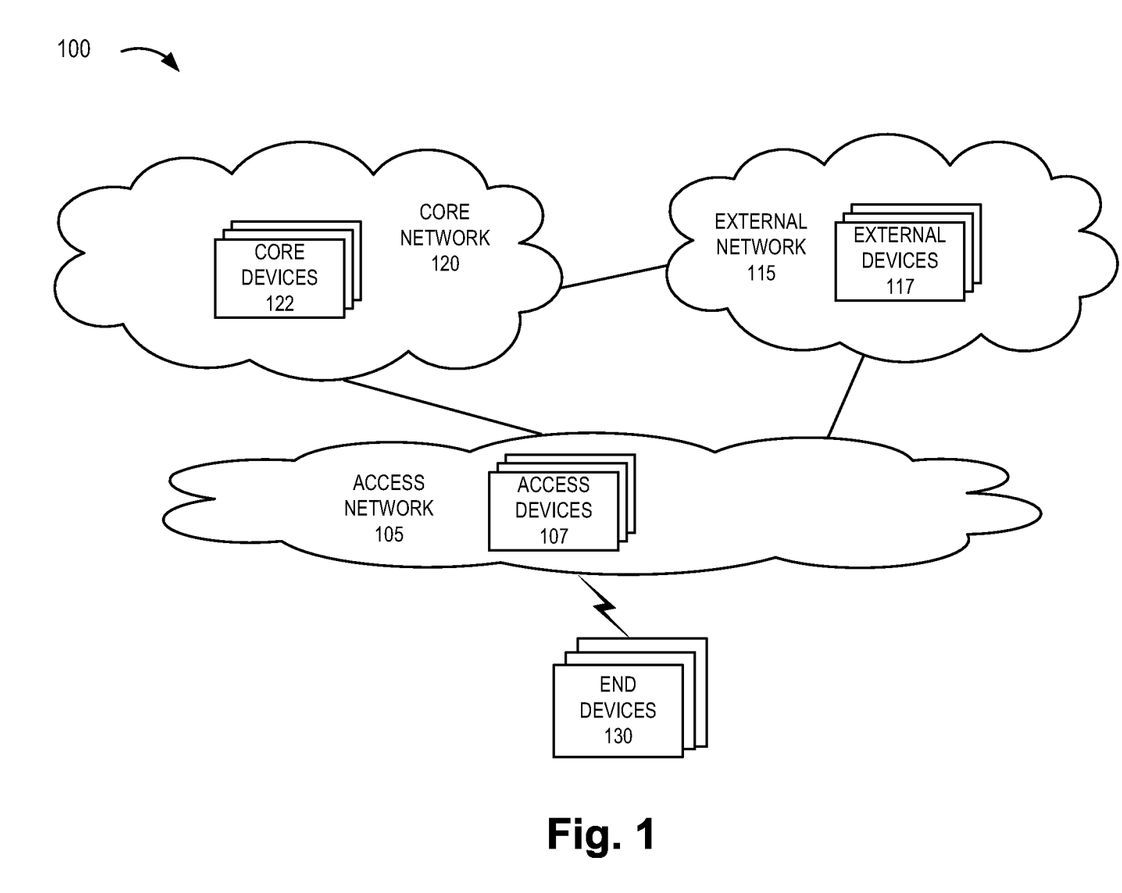
FIG. 1 is a diagram illustrating an exemplary environment in which an exemplary embodiment of a detection and autocorrection of stale session information service may be implemented.

FIG. 1 is a diagram illustrating an exemplary environment 100 in which an exemplary embodiment of detection and autocorrection of stale session information service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), virtual, logical, network slice, etc.). The number, the type, and the arrangement of network devices are exemplary.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the detection and autocorrection of stale session information service may use at least one of these planes of communication. Additionally, an interface of a network device may be modified (e.g., relative to an interface defined by a standards body, such as Third Generation Partnership Project (3GPP), 3GPP2, International Telecommunication Union (ITU), European Telecommunications Standards Institute (ETSI), GSM Association (GSMA), and the like) or a new interface of the network device may be provided in order to support the communication (e.g., transmission and reception of messages, an information element (IE), an attribute value pair (AVP), an object, a header, a parameter, or another form of a data instance) between network devices and the detection and autocorrection of stale session information service logic of the network device. According to various exemplary implementations, the interface of the network device may be a service-based interface, a reference point-based interface, an Open Radio Access Network (O-RAN) interface, a 5G interface, another generation of interface (e.g., 5.5G, Sixth Generation (6G), Seventh Generation (7G), etc.), or some other type of network interface.

Access network 105 may include one or multiple networks of one or multiple types and technologies. For example, access network 105 may be implemented to include a Fifth Generation (5G) RAN, a future generation RAN (e.g., a 6G RAN, a 7G RAN, or a subsequent generation RAN), a centralized-RAN (C-RAN), an O-RAN, and/or another type of access network. Access network 105 may include a legacy RAN (e.g., a Third Generation (3G) RAN, a Fourth Generation (4G) or 4.5 RAN, etc.). Access network 105 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105.

Depending on the implementation, access network 105 may include one or multiple types of network devices, such as access devices 107. For example, access device 107 may include a next generation Node B (gNB), an evolved LTE (eLTE) evolved Node B (eNB), an eNB, a radio network controller (RNC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device.

External network 115 may include one or multiple networks of one or multiple types and technologies that provides an application service. For example, external network 115 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a MEC network, a fog network, the Internet, a PDN, a service provider network, the World Wide Web (WWW), an Internet Protocol Multimedia Subsystem (IMS) network, a Rich Communication Service (RCS) network, an SD network, a virtual network, a packet-switched network, a data center, or other type of network that may provide access to and may host an end device application service.

Depending on the implementation, external network 115 may include various network devices such as external devices 117. For example, external devices 117 may include virtual network devices (e.g., virtualized network functions (VNFs), servers, host devices, containers, hypervisors, virtual machines (VMs), network function virtualization infrastructure (NFVI), and/or other types of virtualization elements, layers, hardware resources, operating systems, engines, etc.) that may be associated with application services for use by end devices (not illustrated). By way of further example, external devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). External network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, conferencing, instant messaging), video streaming, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and/or external devices 117 that may pertain to various network-related functions (e.g., security, management, charging, billing, authentication, authorization, policy enforcement, development, etc.). External devices 117 may include non-virtual, logical, and/or physical network devices.

Core network 120 may include one or multiple networks of one or multiple network types and technologies. Core network 120 may include a complementary network of access network 105. For example, core network 120 may be implemented to include a 5G core network, an evolved packet core (EPC) of a Long Term Evolution (LTE) network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF), a Non-3GPP Interworking Function (N3IWF), an AMF, a SMF, a unified data management (UDM) device, a unified data repository (UDR), an authentication server function (AUSF), a network slice selection function (NSSF), a network repository function (NRF), a PCF, a BSF, a network data analytics function (NWDAF), a network exposure function (NEF), a service capability exposure function (SCEF), a lifecycle management (LCM) device, an application function (AF), a mobility management entity (MME), a packet gateway (PGW), an enhanced packet data gateway (ePDG), a serving gateway (SGW), an application function (AF), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW–C), a UPF with PGW user plane functionality (e.g., UPF+PGW–U), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

End device 130 includes a device that may have communication capabilities (e.g., wireless, wired, optical, etc.). End device 130 may or may not have computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of UE). End device 130 may be configured to execute various types of software (e.g., applications, programs, etc.). The number and the types of software may vary among end devices 130. End devices 130 may include "edge-aware" and/or "edge-unaware" application service clients. For purposes of description, end device 130 is not considered a network device.

Figure 2A:
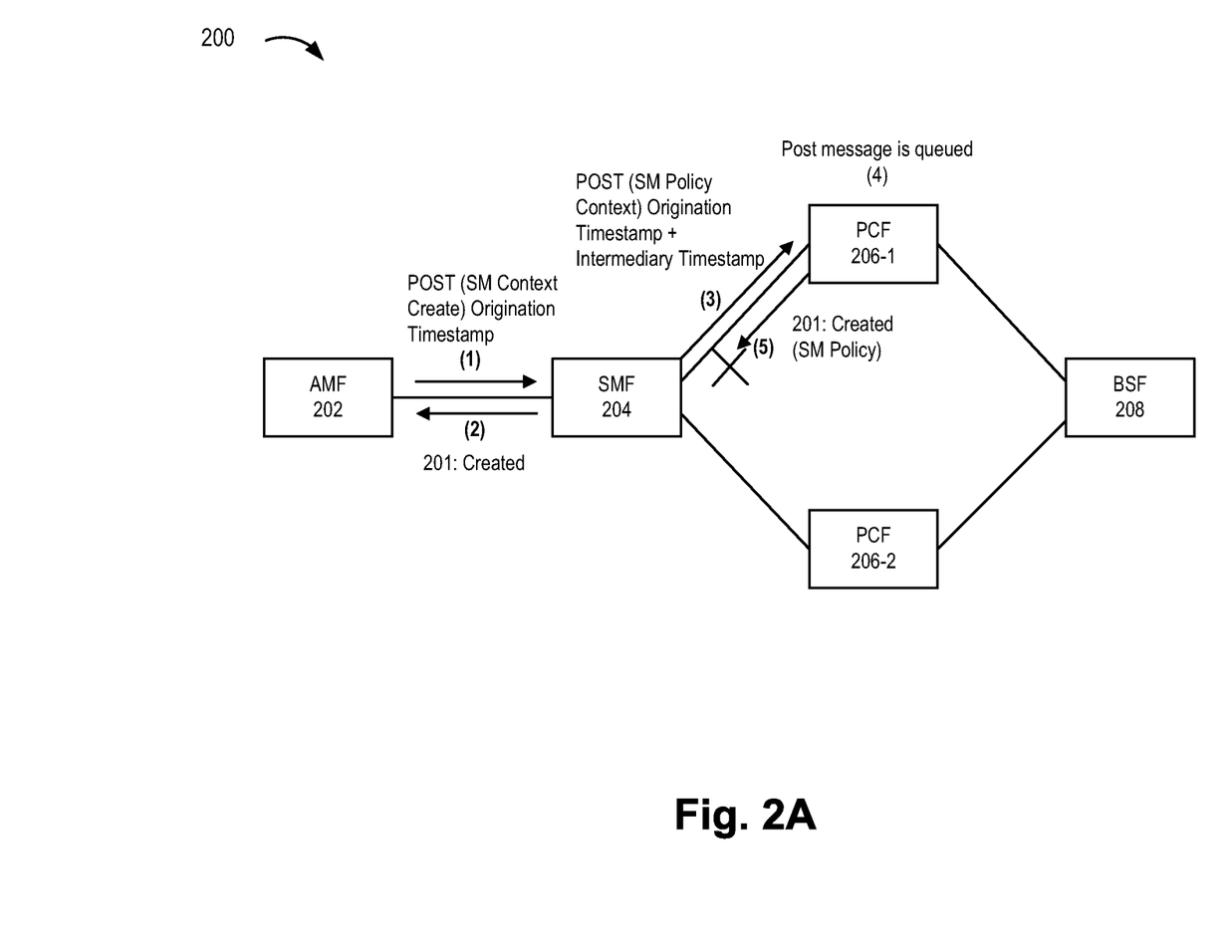
FIGS. 2A-2C are diagrams illustrating an exemplary process of an exemplary embodiment of the detection and autocorrection of stale session information service.
Figure 2B:
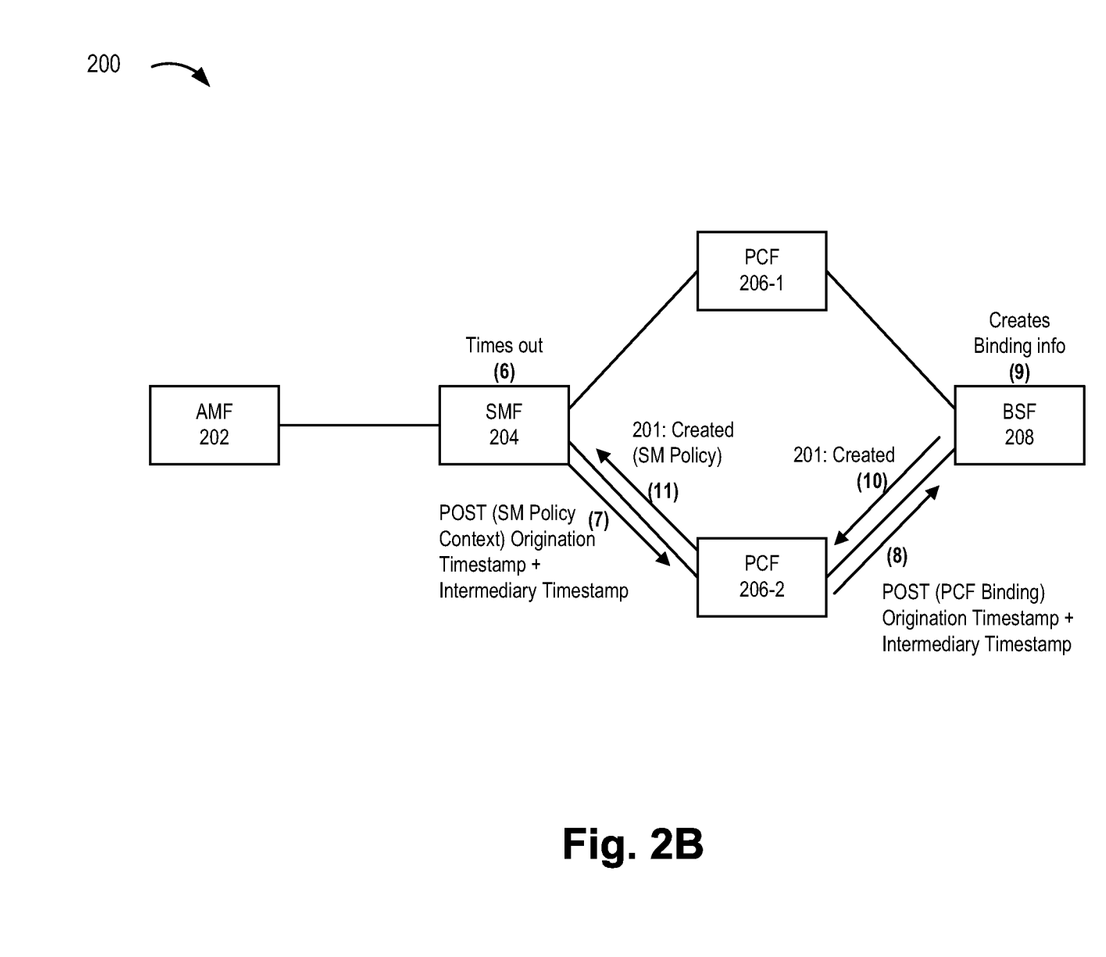
Figure 2C:
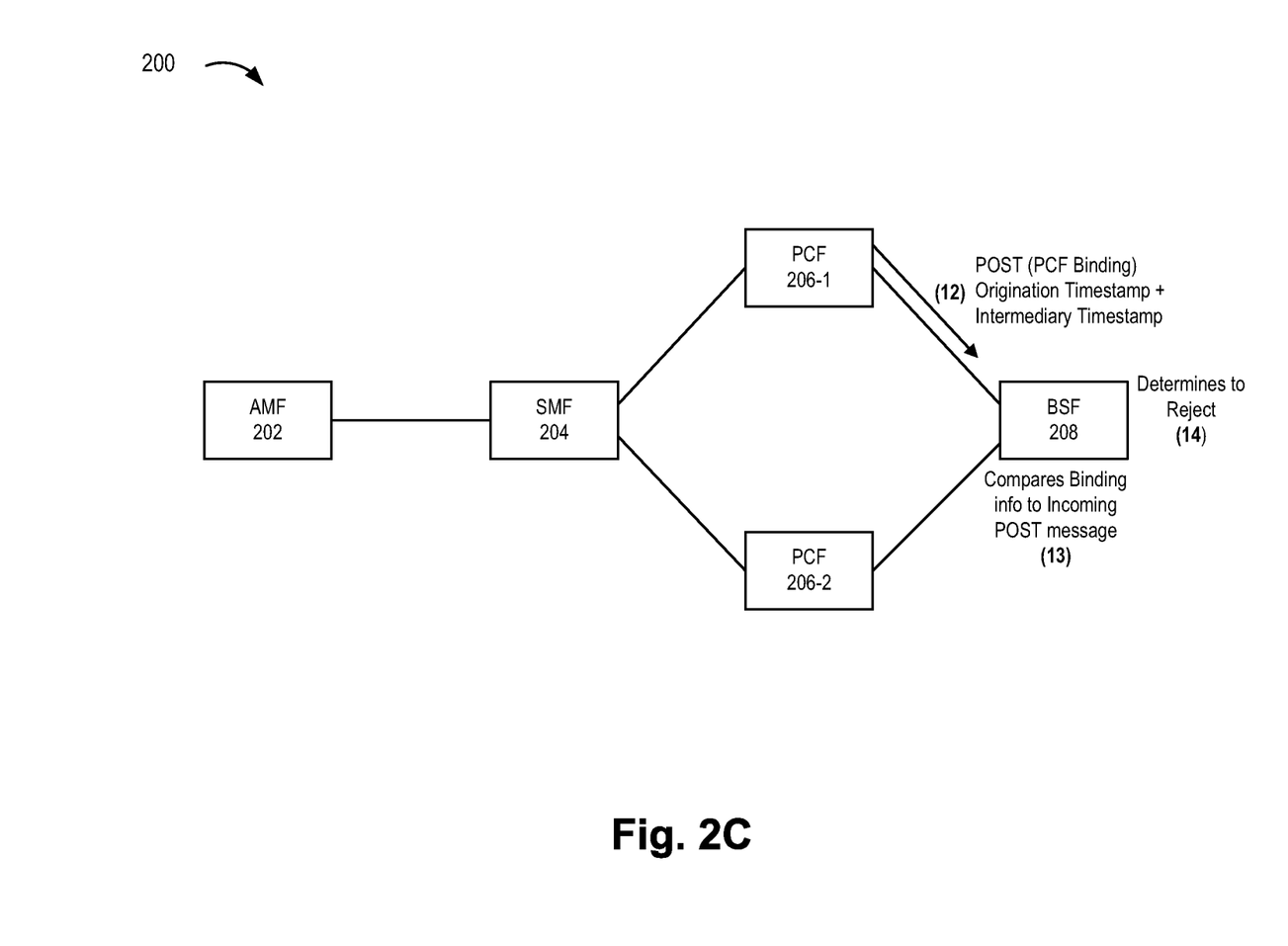

FIGS. 2A-2C are diagrams illustrating an exemplary process 200 of an exemplary embodiment of the detection and autocorrection of stale session information service according to an exemplary scenario. As illustrated, process 200 may implemented in an environment that includes core devices 122, such as an AMF 202, an SMF 204, a PCF-206-1, a PCF-206-2, and a BSF 208. As described in relation to FIG. 1, according to other exemplary embodiments, the environment may include other types of core devices 122, not specifically illustrated and described in FIGS. 2A-2C. For example, PCF 206-1 and/or PCF 206-2 (also referred to collectively as PCFs 206, and generally or individually as PCF 206) may be implemented as an SM PCF or a PCRF+PCF. Additionally, or alternatively, SMF 204 may be implemented as a PGW–C+SMF, for example. BSF 208 may alternatively be implemented as a Session Binding Function (SBF)+BSF or an SBF, for example. The message illustrated and described are exemplary. Additionally, process 200 may include additional messages and/or communications between core devices 122 not specifically described and illustrated.

AMF 202, SMF 204, PCF 206, and BSF 208 may each provide a function and/or a service in accordance with a network standard (e.g., 3GPP, 3GPP2, ITU, ETSI, GSMA, and/or the like) and/or of a proprietary nature. For example, AMF 202 may provide registration, connection, reachability, and mobility management, security context management, location service management, UE mobility event notification, among other functions. SMF 204 may provide session management, Internet Protocol (IP) address allocation and management, selection and control of user plane (UP) function, configuration of traffic steering, control of policy enforcement and QoS, among other functions. PCF 206 may provide policies/rules to control plane network devices, make policy decisions based on subscription information, among other functions. BSF 208 may create binding information pertaining to a session, support management and discovery services, such as allow network devices to register, update and remove binding information, and allow network devices to discover the binding information, among other functions. Additionally, for example, SMF 204, PCF 206, and BSF 208 may include logic of an exemplary embodiment of a detection and autocorrection of stale session information service, as described herein.

Referring to FIG. 2A, according to an exemplary scenario, assume that end device 130 (not illustrated) initiates a PDU session setup (e.g., a NAS request) that is received by AMF 202. Based on the PDU session setup, AMF 202 may select SMF 204, and in step (1), generates and transmits an HTTP POST message, which includes a request to create an SM context (e.g., SM Context Create), to SMF 204. As illustrated, the HTTP POST message includes an Origination-Timestamp HTTP header that is set by AMF 202. The Origination-Timestamp HTTP header may serve as an indication a date and a time that the HTTP POST message is transmitted. Additionally, or alternatively, the Origination-Timestamp HTTP header may also serve as an indication when the SM procedure was initiated by AMF 202. The granularity of time may be on a millisecond scale or some other configurable time scale (e.g., a coarser or finer time scale), for example. Although not illustrated, SMF 204 may perform a registration procedure (e.g., with a UDM not illustrated), obtain subscription data pertaining to end device 130, and may perform an authentication and/or authorization for the PDU session. SMF 204 may, in step (2), generate and transmit an HTTP 201 (Created) message to AMF 202 in response to the HTTP POST message in step (1) and having successfully completing the registration procedure, etc., as mentioned herein.

SMF 204 may, in step (3), select a PCF (e.g., PCF 206-1), and generate and transmit an HTTP POST message, which includes a request to create an SM policy association with the PCF and receive an SM policy for the PDU session (e.g., SM Policy Context), to PCF 206-1. According to an exemplary embodiment of the detection and autocorrection of stale session information service, the HTTP POST message includes the Origination-Timestamp HTTP header included in the HTTP POST message set by AMF 202, in step (1), and includes an Intermediary-Timestamp HTTP header set by SMF 204. The Intermediary-Timestamp HTTP header includes a date and a time that the HTTP POST message is transmitted by SMF 204 to PCF 206-1.

According to this exemplary scenario, PCF 206-1 receives the HTTP POST message and in response, in step (4), PCF 206-1 may generate an HTTP POST message, which includes a PCF binding request. The HTTP POST message may be queued at PCF 206-1 for transmission to BSF 208. Additionally, PCF 206-1 may, in step (5), generate and transmit an HTTP 201 (Created) message to SMF 204 without having sent a message (e.g., the PCF Binding Request) to BSF 208 or PCF 206-1 may transmit the message but does not receive a response from BSF (e.g., a message indicating success in creation of binding information). As further illustrated, according to the exemplary scenario, assume that SMF 204 does not receive the HTTP 201 (Created) message from PCF 206-1.

Referring to FIG. 2B, because SMF 204 does not receive the HTTP 201 (Created) message, in step (6), SMF 204 times out (e.g., a timer expires), and in step (7), SMF 204 may select another PCF (e.g., PCF 206-2), generate, and transmit an HTTP POST message, which includes a request to create an SM policy association with the PCF and receive an SM policy for the PDU session (e.g., SM Policy Context), to PCF 206-2. According to an exemplary embodiment of the detection and autocorrection of stale session information service, the HTTP POST message includes the Origination-Timestamp HTTP header included in the HTTP POST message set by AMF 202, in step (1), and includes an Intermediary-Timestamp HTTP header set by SMF 204. The Intermediary-Timestamp HTTP header includes a date and a time that the HTTP POST message is transmitted by SMF 204 to PCF 206-2 (which is different from the Intermediary-Timestamp HTTP header of the HTTP POST message transmitted to PCF 206-1).

PCF 206-2 receives the HTTP POST message and, in step (8), may generate and transmit an HTTP POST message, which includes a PCF Binding request, the Origination-Timestamp HTTP header, and the Intermediary-Timestamp HTTP header, to BSF 208. BSF 208 receives the HTTP POST message, and in step (9), may create the binding information pertaining to the PDU session. For example, the binding information may include an end device identifier (e.g., a Subscription Permanent Identifier (SUPI) or another type of identifier and/or network address associated with end device 130, an identifier of a user of end device 130, etc.), a Data Network Name (DNN) or the like, a network slice identifier (e.g., Single-Network Slice Selection Assistance Information (S-NSSAI) or the like), a PCF identifier (e.g., a network address, a (unique) identifier, or the like), the Origination-Timestamp, and the Intermediary-Timestamp. According to other exemplary implementation, the binding information may store additional, fewer, and/or different instances of information. In step (10), BSF 208 may generate and transmit an HTTP 201 (Created) message to PCF 206-2. In response to receiving the HTTP 201 (Created) message, in step (11), PCF 206-2 may generate and transmit an HTTP 201 (Created SM Policy Decision) message to SMF 204.

Referring to FIG. 2C, in step (12), PCF 206-1 may generate and transmit the HTTP POST message, which was queued, as described in step (4) of FIG. 2A, to BSF 208. According to various exemplary scenarios, the transmission of the HTTP POST message or the receipt by BSF 208 of the HTTP POST message may occur after step (9), for example. As illustrated, BSF 208 may receive the HTTP POST message, perform a lookup, and in step (13) may compare the binding information (e.g., created in step (9)) with the contents of the HTTP POST message. According to an exemplary embodiment of the detection and autocorrection of stale session information service, BSF 208 may determine that the currently stored binding information pertains to the same PDU session, end device 130, and so forth. BSF 208 may also determine, based on the comparison, that the Origination-Timestamp is the same as that included in the HTTP POST message. However, BSF 208 may determine that the Intermediary-Timestamp included in the HTTP POST message is older than the Intermediary-Timestamp included in the currently stored binding information. According to this exemplary scenario, in step (14), BSF 208 may determine to reject or ignore the incoming HTTP POST message. As a result, BSF 208 may not overwrite the existing binding information and the stored binding information accurately indicates that PCF 206-2 is associated with the PDU session. In this way, for example, an Application Function (AF), a NEF, or another type of network device may obtain accurate binding information, and may prevent a failure in establishing a PDU session (e.g., an application service session with external device 117) or other network procedure/operation.

FIGS. 2A-2C are diagrams illustrating an exemplary process of an exemplary embodiment of the detection and autocorrection of stale session information service. According to other exemplary embodiments and scenarios, the process may include additional operations, fewer operations, and/or different operations. For example, in the case where the Intermediary-Timestamp of the incoming HTTP POST message was younger (i.e., the existing binding information included an Intermediary-Timestamp was older), BSF 208 may overwrite the existing binding information in accordance with the PCF binding information included in the HTTP POST message. Additionally, as described herein, according to other exemplary scenarios, BSF 208 may create a new binding when the HTTP POST message relates to a different PDU session, and so forth.

Figure 3:
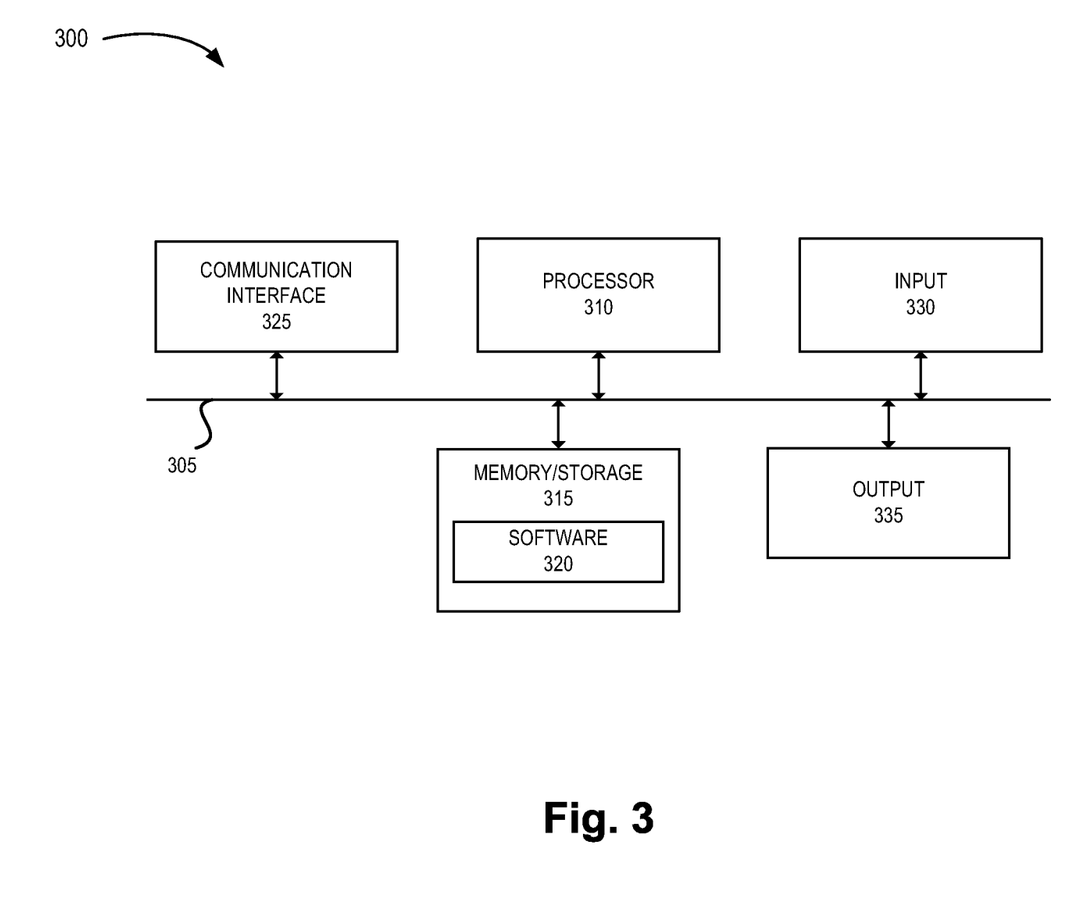
FIG. 3 is a diagram illustrating exemplary components of a device that may correspond to one or more of the devices illustrated and described herein.

FIG. 3 is a diagram illustrating exemplary components of a device 300 that may be included in one or more of the devices described herein. For example, device 300 may correspond to access device 107, external device 117, core device 122, end device 130, AMF 202, SMF 204, PCF 206, BSF 208, and/or other types of devices, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. As an example, with reference to SMF 204, software 320 may include an application that, when executed by processor 310, provides a function and/or a process of detection and autocorrection of stale session information service, as described herein. Additionally, with reference to BSF 208, software 320 may include an application that, when executed by processor 310, provides a function and/or a process of detection and autocorrection of stale session information service, as described herein. Software 320 may also include firmware, middleware, microcode, hardware description language (HDL), and/or other form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces, optical interfaces, and/or wired interfaces. For example, communication interface 325 may include one or multiple transmitters and receivers, or transceivers. Communication interface 325 may operate according to a protocol stack and a communication standard.

Input 330 permits an input into device 300. For example, input 330 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 300 may be implemented in the same manner. For example, device 300 may be instantiated, created, deleted, or some other operational state during its life-cycle (e.g., refreshed, paused, suspended, rebooting, or another type of state or status), using well-known virtualization technologies. For example, access device 107, core device 122, external device 117, and/or another type of network device or end device 130, as described herein, may be a virtualized device.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a function or a process described herein. Alternatively, for example, according to other implementations, device 300 performs a function or a process described herein based on the execution of hardware (processor 310, etc.).

Figure 4A:
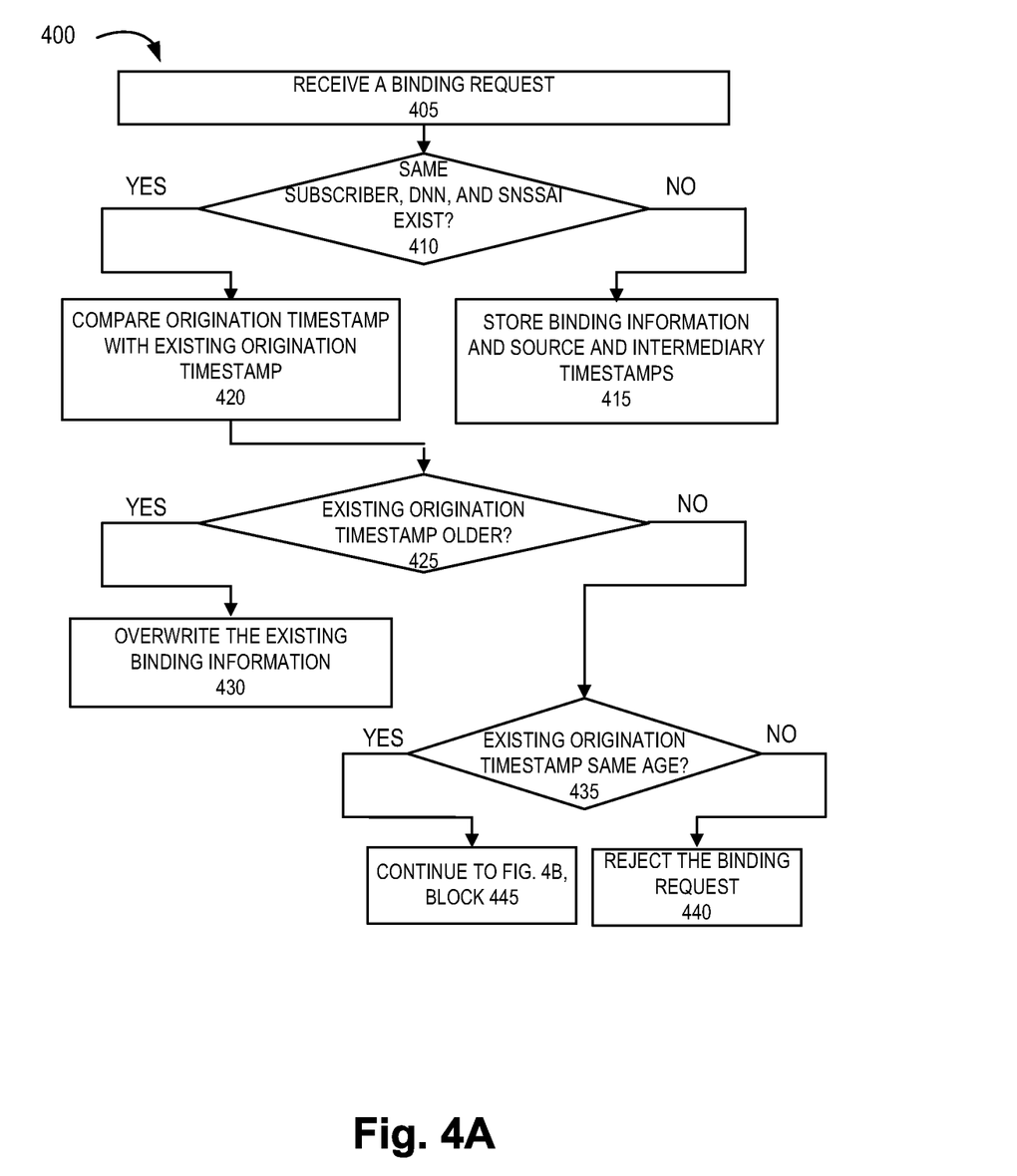
FIGS. 4A and 4B are flow diagrams illustrating another exemplary process of an exemplary embodiment of the detection and autocorrection of stale session information service.
Figure 4B:
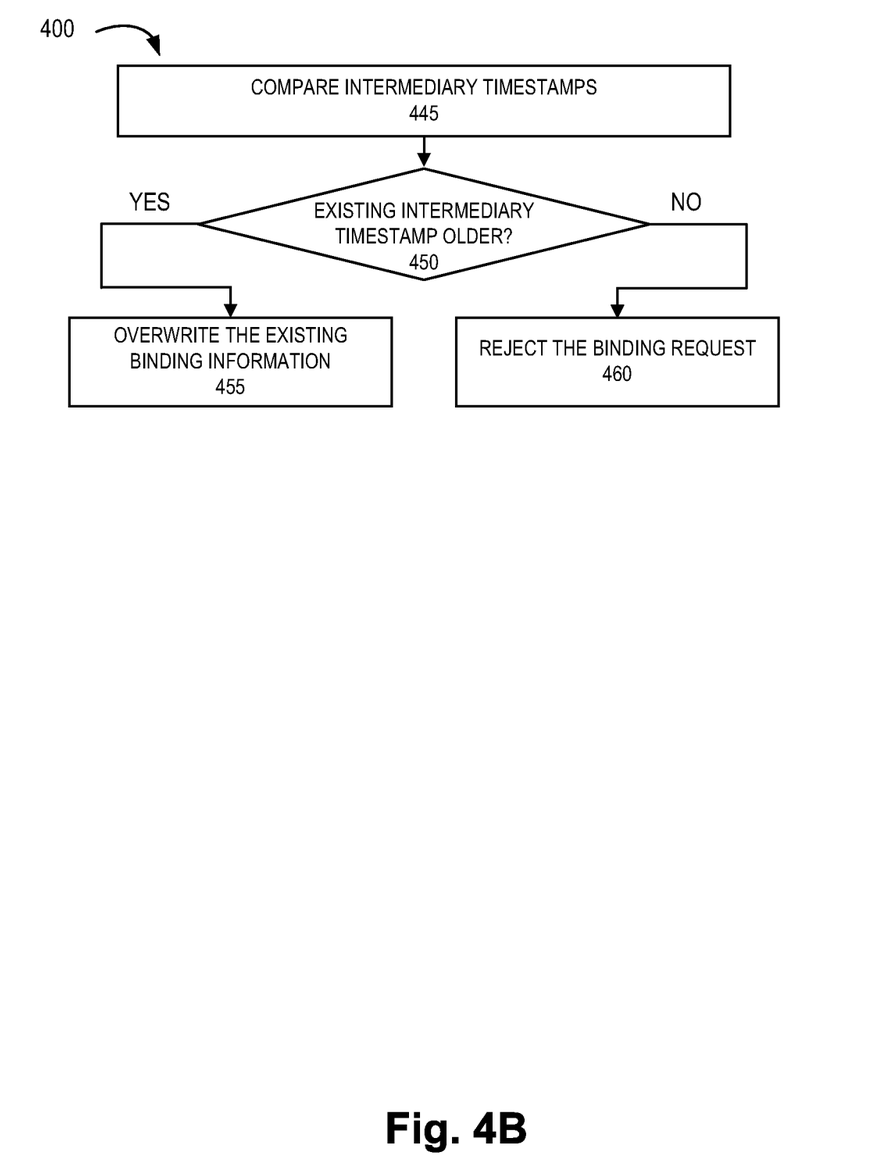

FIGS. 4A and 4B are flow diagrams illustrating an exemplary process 400 of an exemplary embodiment of the detection and autocorrection of stale session information service. According to an exemplary embodiment, a BSF (e.g., BSF 208) may perform a step of process 400. According to an exemplary implementation, processor 310 executes software 320 to perform a step of process 400, as described herein. Alternatively, a step may be performed by execution of only hardware.

In block 405, a BSF may receive a binding request. For example, BSF 208 may receive a binding request from a PCF that relates to a setup of a PDU session. The binding request may include binding information, an Origination-Timestamp, and an Intermediary-Timestamp, as described herein.

In block 410, the BSF may determine whether the binding request includes binding information that is the same as binding information stored. For example, BSF 208 may compare multiple instances of data, such as subscriber information (e.g., end device identifier and/or the like), DNN, S-NSSAI, and/or other types of information, as described herein.

When the BSF determines that the binding request does not include binding information that is the same (block 410—NO), the BSF may store the binding information with the Original and Intermediary Timestamps (block 415). When the BSF determines that the binding request does include binding information that is the same (block 410—YES), the BSF may compare the Origination-Timestamp included in the binding request with the Origination-Timestamp included in the binding information already stored (block 420).

In block 425, the BSF may determine whether the existing Origination-Timestamp is older based on the comparison. When the BSF determines that the existing Origination-Timestamp is older (block 425—YES), the BSF may overwrite the existing binding information with the binding information included in the binding request (block 430). When the BSF determines that the existing Origination-Timestamp is not older (block 425—NO), the BSF may determine whether the existing Origination-Timestamp is the same age (block 435). When the existing Origination-Timestamp is not the same age (block 435—NO), the BSF may reject or ignore the binding request (block 440). When the existing Origination-Timestamp is the same age (block 435—YES), process 400 may continue to block 445 of FIG. 4B.

Referring to FIG. 4B, in block 445, the BSF may compare the Intermediary-Timestamp included in the existing binding information to the Intermediary-Timestamp included in the binding request. Based on the comparison, in block 450, the BSF may determine whether the Intermediary-Timestamp included in the existing binding information is older than the Intermediary-Timestamp included in the binding request. When the Intermediary-Timestamp included in the existing binding information is older (block 450—YES), the BSF may overwrite the binding information with the binding information included in the binding request (block 455). When the Intermediary-Timestamp included in the existing binding information is younger (e.g., more recent) (block 450—NO), the BSF may reject or ignore the binding request (block 460).

FIGS. 4A and 4B illustrate an exemplary process of the detection and autocorrection of stale session information service, according to other exemplary embodiments, the detection and autocorrection of stale session information service may perform additional operations, fewer operations, and/or different operations than those illustrated and described.

Figure 5:
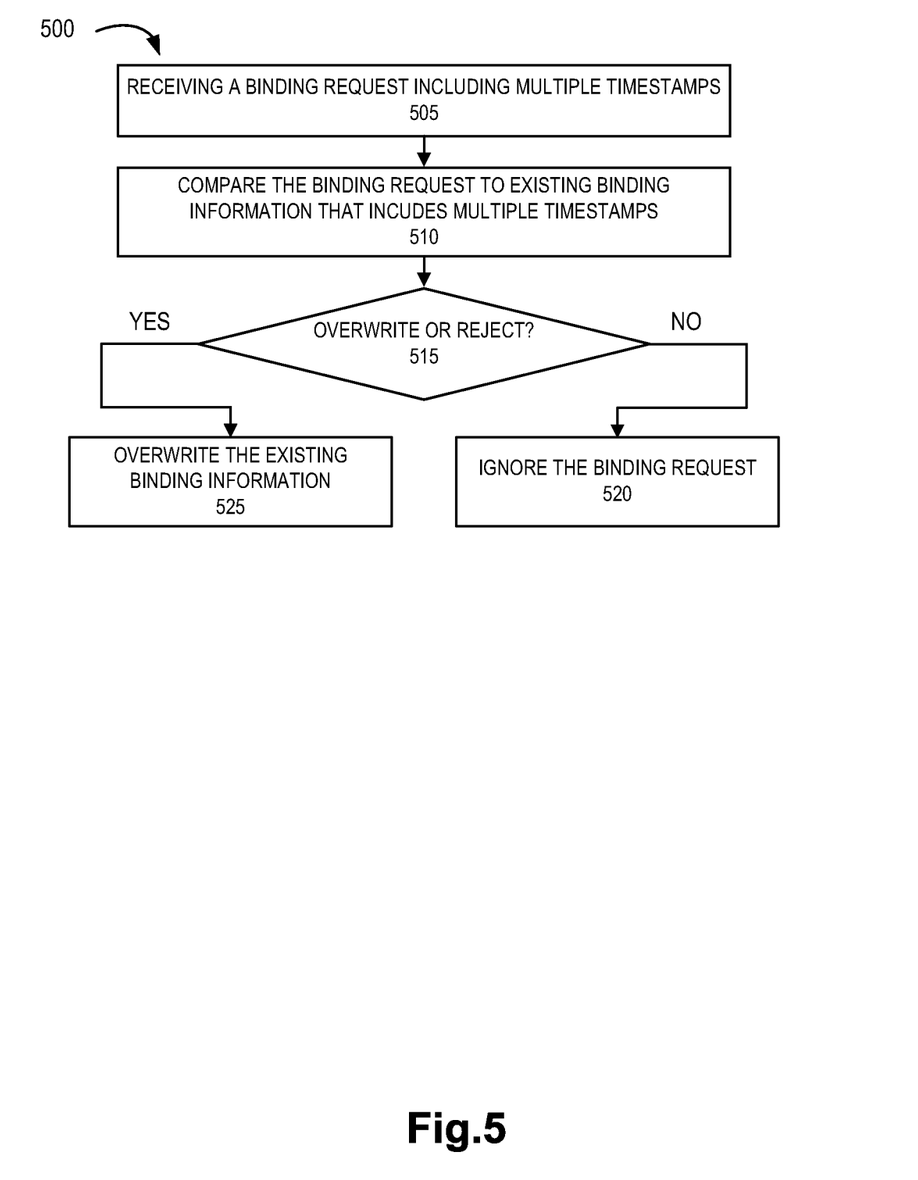
FIG. 5 is a diagram illustrating yet another exemplary process of an exemplary embodiment of the detection and autocorrection of stale session information service.

FIG. 5 is a flow diagram illustrating yet another exemplary process 500 of an exemplary embodiment of the detection and autocorrection of stale session information service. According to an exemplary embodiment, a BSF (e.g., BSF 208) may perform a step of process 500. According to an exemplary implementation, processor 310 executes software 320 to perform a step of process 500, as described herein. Alternatively, a step may be performed by execution of only hardware.

In block 505, the BSF may receive a binding request that includes multiple timestamps. For example, the BSF may receive the binding request that includes an Origination-Timestamp and an Intermediary-Timestamp, as described herein.

In block 510, the BSF may compare the binding request to existing binding information, which also includes multiple timestamps. The binding request and the existing binding information may pertain to the same PDU session, DNN, network slice, end device, and so forth, as described herein. The BSF may make this determination based on the comparison. The BSF may compare the timestamps of the binding request and the existing binding information.

In block 515, the BSF may make a binary choice as to whether to overwrite the existing binding information or ignore the binding request, as described herein, based on the comparison. Based on a result of the comparison, the BSF may ignore the binding request (block 520) or overwrite the existing binding information (block 525), as described herein.

FIG. 5 illustrate an exemplary process of the detection and autocorrection of stale session information service, according to other exemplary embodiments, the detection and autocorrection of stale session information service may perform additional operations, fewer operations, and/or different operations than those illustrated and described. For example, according to other exemplary embodiments, a network device different from a BSF may perform process 500. As an example, the network device may be a destination device of a network procedure chain that may be subject to duplicate messaging associated with a network procedure and communication that includes an O-T HTTP header detection mechanism. The network device may detect and autocorrect stale information based on one or multiple Intermediary-Timestamps associated with a message received during an execution of the network procedure.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described regarding the processes illustrated in FIG. 4, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   receiving, by a binding support device from a policy control device, a binding request;
   comparing, by the binding support device, the binding request to binding information stored at the binding support device; and
   determining, by the binding support device, whether to reject the binding request or overwrite the binding information based on a comparison of first timestamps included in the binding information and second timestamps included in the binding request, wherein to reject or to overwrite is a binary choice, and wherein a first timestamp of the first timestamps and a first timestamp of the second timestamps each include a timestamp generated and set by a session management function.

2. The method of claim 1, wherein a second timestamp of the first timestamps is a same value as a second timestamp of the second timestamps.

3. The method of claim 1, wherein the first timestamps and the second timestamps each include an origination-timestamp set by an access and mobility management function.

4. The method of claim 1, wherein the first timestamp of the first timestamps and the first timestamp of the second timestamps each indicates a date and time that a message is transmitted by the session management function.

5. The method of claim 1, wherein when the first timestamp of the second timestamps is more recent than the first timestamp of the first timestamps, the method further comprises:
   overwriting, by the binding support device, the binding information based on the binding request.

6. The method of claim 1, wherein when the first timestamp of the second timestamps is older than the first timestamp of the first timestamps, the method further comprises:
   ignoring, by the binding support device, the binding request.

7. The method of claim 1, wherein the binding request and the binding information pertain to a same end device, a same data network name, and a same packet data unit session.

8. The method of claim 1, wherein the binding support device includes a binding support function of a core network.

9. A network device comprising:
   a processor that is configured to:
      receive, from a policy control device, a binding request, wherein the network device is a binding support device;
      compare the binding request to binding information stored at the binding support device; and
      determine whether to reject the binding request or overwrite the binding information based on a comparison of first timestamps included in the binding information and second timestamps included in the binding request, wherein to reject or to overwrite is a binary choice, and wherein a first timestamp of the first timestamps and a first timestamp of the second timestamps each include a timestamp generated and set by a session management function.

10. The network device of claim 9, wherein a second timestamp of the first timestamps is a same value as a second timestamp of the second timestamps.

11. The network device of claim 9, wherein the first timestamps and the second timestamps each include an origination-timestamp set by an access and mobility management function.

12. The network device of claim 9, wherein the first timestamp of the first timestamps and the first timestamp of the second timestamps each indicates a date and time that a message is transmitted by the session management function.

13. The network device of claim 9, wherein when the first timestamp of the second timestamps is more recent than the first timestamp of the first timestamps, the processor is further configured to:
    overwrite the binding information based on the binding request.

14. The network device of claim 9, wherein when the first timestamp of the second timestamps is older than the first timestamp of the first timestamps, the processor is further configured to:
    ignore the binding request.

15. The network device of claim 9, wherein the binding request and the binding information pertain to a same end device, a same data network name, and a same packet data unit session.

16. The network device of claim 9, wherein the binding support device includes a binding support function of a core network.

17. A non-transitory computer-readable storage medium storing instructions executable by a processor of a binding support device, wherein the instructions are configured to:
    receive, from a policy control device, a binding request;
    compare the binding request to binding information stored at the binding support device; and
    determine whether to reject the binding request or overwrite the binding information based on a comparison of first timestamps included in the binding information and second timestamps included in the binding request, wherein to reject or to overwrite is a binary choice, and wherein a first timestamp of the first timestamps and a first timestamp of the second timestamps each include a timestamp generated and set by a session management function.

18. The non-transitory computer-readable storage medium of claim 17, wherein a second timestamp of the first timestamps is a same value as a second timestamp of the second timestamps.

19. The non-transitory computer-readable storage medium of claim 17, wherein the first timestamps and the second timestamps each include an origination-timestamp set by an access and mobility management function.

20. The non-transitory computer-readable storage medium of claim 17, wherein the binding request and the binding information pertain to a same end device, a same data network name, and a same packet data unit session.

* * * * *